United States Patent [19]

Record

[11] Patent Number: 5,440,846
[45] Date of Patent: Aug. 15, 1995

[54] CONSTRUCTION FOR BUILDING PANELS AND OTHER BUILDING COMPONENTS

[76] Inventor: Grant C. Record, 5423 Ramblewood La., Olympia, Wash. 89503

[21] Appl. No.: 959,226

[22] Filed: Nov. 13, 1992

[51] Int. Cl.$^6$ ............................................. E04C 1/00
[52] U.S. Cl. ............................ 52/309.15; 52/309.9; 52/309.12; 52/309.17; 52/405.1; 52/412
[58] Field of Search ........ 52/600, 309.12, 309.15 OR, 52/309.17, 405.1, DIG. 7, 411, 412, 408, 309.9

[56] References Cited

U.S. PATENT DOCUMENTS

| | | |
|---|---|---|
| 2,232,588 | 2/1941 | Camp . |
| 3,145,502 | 8/1964 | Rubenstein ................. 52/309.15 |
| 3,152,198 | 10/1964 | Williams ......................... 52/600 |
| 3,725,185 | 9/1973 | Curtis ........................ 52/309.17 |
| 3,826,051 | 7/1974 | Miller et al. ..................... 52/600 |
| 3,885,363 | 5/1975 | Whittey ........................... 52/405 |
| 3,979,217 | 9/1976 | Sutton . |
| 4,130,973 | 12/1978 | Gustausson ................ 52/309.17 |
| 4,132,043 | 1/1979 | Juba ........................... 52/309.17 |
| 4,263,765 | 4/1981 | Maloney ......................... 52/405 |
| 4,292,364 | 9/1981 | Wesch et al. .............. 52/309.17 |
| 4,304,080 | 12/1981 | Freeman ...................... 52/309.9 |
| 4,306,395 | 12/1981 | Carpenter .................. 52/309.12 |
| 4,306,911 | 12/1981 | Gordon et al. . |
| 4,377,415 | 3/1983 | Johnson et al. . |
| 4,449,336 | 5/1984 | Kelly ............................ 52/408 X |
| 4,567,705 | 2/1986 | Carlson ...................... 52/309.17 |
| 4,614,071 | 9/1986 | Sams et al. ..................... 52/405 |
| 4,628,653 | 12/1986 | Nash ............................... 52/405 |
| 4,712,349 | 12/1987 | Riley et al. ................ 52/309.12 |
| 4,746,365 | 5/1988 | Babcock et al. . |
| 4,774,794 | 10/1988 | Grieb .......................... 52/309.17 |
| 4,841,702 | 6/1989 | Huettemann ............... 52/309.12 |
| 4,877,679 | 10/1989 | Leatherman et al. . |
| 4,942,702 | 7/1990 | Lemasson ....................... 52/405 |
| 5,138,773 | 8/1992 | Goodwin et al. ............. 52/408 X |
| 5,245,810 | 9/1993 | Foss ................................ 52/405 |

Primary Examiner—Carl D. Friedman
Assistant Examiner—Wynn E. Wood
Attorney, Agent, or Firm—Seed and Berry

[57] ABSTRACT

A composite building component is formed of a cement composition having a sufficient amount of diatomaceous earth and/or other thermally insulating material(s), in specific ratio to entrained air contained in fluid pockets, to provide substantial thermal insulation and resistance to decomposition which would otherwise occur at very high temperatures. The cement composition is poured/placed in a 2 to 6 sided pre-formed box or half box with integral insulating core. The pre-formed box becomes bound to the poured/placed cement composition and upon curing, becomes an integral part of the final product. The cement composition may also include an amount of fibrous material and/or organic binder(s) (integrally and/or impregnated) sufficient to increase the tensile strength, handleability, and machineability of the building components. A cement composition is initially created to include a plurality of fluid pockets as the basis for achieving the features cited. The number and size of the fluid pockets is adjusted to provide different strength verses weight ratio products. The building components include a surface material that has an organic polymer applied to a first side thereof. The cement composition is provided with a sufficient amount of a chemically active component to bind with the organic polymer applied to the surface material so that the surface material is substantially integrally formed with the building component. The ratio of building component weight versus strength versus size can be readily adjusted by varying the internal core geometry and size, versus total end product size, versus density/strength of cement composition filler material.

47 Claims, 3 Drawing Sheets

Figure 3 ated skin surfaces, such as veneer, phenolic, vinyl, etc., cannot be sufficiently bound to the rough surface of concrete panels without considerable secondary preparation. It is desirable, however, to be able to firmly and cost effectively affix to the building panels, laminated skin surfaces such as those discussed above. Accordingly, in addition to the lack of flexibility, high weight, and lack of insulating properties, these prior art concrete panels are further disadvantageous because of the inability to consistently affix laminated skin surfaces to the rough and/or damp surface of the concrete.

CONSTRUCTION FOR BUILDING PANELS AND OTHER BUILDING COMPONENTS

TECHNICAL FIELD

The present invention is directed toward building components used for building construction and, more particularly, toward a construction for premanufactured, composite panels or other composite building components that exhibit improved strength, weight, and size characteristics.

BACKGROUND OF THE INVENTION

Recent changes in todays housing industry has led to an increased desire by builders for using pre-manufactured, or fabricated, construction components. As example, builders are now able to use pre-manufactured building panels, for walls, roofs, floors, doors and other building components which lend themselves to a composite structure. Such components are desirable since they decrease greatly the time and expense involved in constructing new building structures. However, the use of pre-manufactured building components requires these components to meet the structural specifications necessary for the resulting structure. The structural specifications are typically based on three structural criteria that are of primary interest, i.e., load bearing strength, shear strength, and total weight. Additional criteria that may effect the desired specifications are fire resistance, thermal efficiency, acoustical rating, rot and insect resistance, and water resistance. In addition, it is desirable for pre-manufactured components to be readily transportable, e.g., lightweight, easily packaged, and easily handled.

Pre-manufactured composite components for building construction have in the past had a variety of constructions. A common component is a laminated or composite, panel. One such panel includes a core material of foam, or other insulating material, that may in some embodiments have vertical members for adding structural support. The core material is positioned between wood members and the combination fixed together, e.g., nailed, screwed, and/or glued together. These panels suffer from the disadvantages of being combustible as well as inadequate sound barriers. Further, these panels are subject to rot, decay, and insect attack. Accordingly, panels constructed in this manner are not deemed satisfactory in many modern building applications.

In a variation of the above-described building panel, a laminated skin is fixed to the outside of the wood members. In addition to the inadequacies discussed above, these panels suffer from the added disadvantage of being more expensive.

In another known construction for building panels, a foam core is positioned between metal members. Decorative material is typically bonded to the outside of the metal members to provide these building panels. These panels are expensive and suffer from the disadvantage of being very sound transmissive. As a result of their sound transmission properties, an inside wall is generally required to provide an acoustical barrier, thereby further increasing the cost of using these panels. Such panels are not generally suitable for load-bearing applications.

Concrete panels have been used as a base for laminating composite layers. Building panels, however, constructed with prior art concrete compositions result in a rough, often wet, surface having a lamination bonding quality that is difficult and inconsistent. As a result, laminated skin surfaces, such as veneer, phenolic, vinyl, etc., cannot be sufficiently bound to the rough surface of concrete panels without considerable secondary preparation. It is desirable, however, to be able to firmly and cost effectively affix to the building panels, laminated skin surfaces such as those discussed above. Accordingly, in addition to the lack of flexibility, high weight, and lack of insulating properties, these prior art concrete panels are further disadvantageous because of the inability to consistently affix laminated skin surfaces to the rough and/or damp surface of the concrete.

Accordingly, it is desirable to provide building panels or other composite building components that are relatively lightweight and strong. It is further desirable to provide such a building component that is also a good heat and sound insulator. It is further desirable to provide such a building component that is also resistant to water, fire and rotting. It is also desirable to provide a building component having all of the foregoing properties, and which is easily handled and reasonably priced. To accomplish these criteria across a wide range of applications, it is desirable for a manufacturer to be able to change weight versus size versus strength relationships readily. The above-cited popular constructions do not generally provide a natural method of changing size versus weight versus strength relationships over a wide dynamic range.

SUMMARY OF THE INVENTION

The present invention is directed toward a method for constructing building panels and other composite building components including the step of applying an organic component to a side cover surface material and permitting the organic polymer to dry. A filler material is provided wherein the filler material includes a sufficient amount of a chemically active component to bond with the organic component on the surface of the side cover surface material. The side cover surface material is then positioned in contact with the filler material while the filler material is being poured/placed so that the organic polymer of the side cover surface material will bond with the chemically compatible components of the filler material in order that the side cover surface material will become a bound integral part of the building component.

A unique point of difference in this invention and common practice within the building component industry is: strength and weight adjustable cement compositions (not limited to Portland Cement based products) are poured into pre-constructed 2 to 6 sided box or half box forms in such a manner as to complete building component construction in one step, in that the form box or half form box is an integral part of the final product.

In one presently preferred embodiment of the invention, the filler material of building panels constructed in accordance with the method of the subject invention is a cement composition containing fluid pockets wherein each of the fluid pockets is of substantially similar size and wherein the fluid pockets are substantially evenly distributed throughout the cement base. The building panel may also include panel surface material having an organic component applied to a first side thereof wherein the first side of the panel surface material is substantially integrally formed with the cement composition by the bonding of organic components on the panel inside surface and organic compatible constituents in the cement composition.

BRIEF DESCRIPTION OF THE DRAWINGS

The above figures, with dimensional changes, can represent configurations of other building components such as beams, braces, and doors. The word "panel" is used herein in the most general, all-inclusive sense.

DETAILED DESCRIPTION OF THE INVENTION

Figure 1:
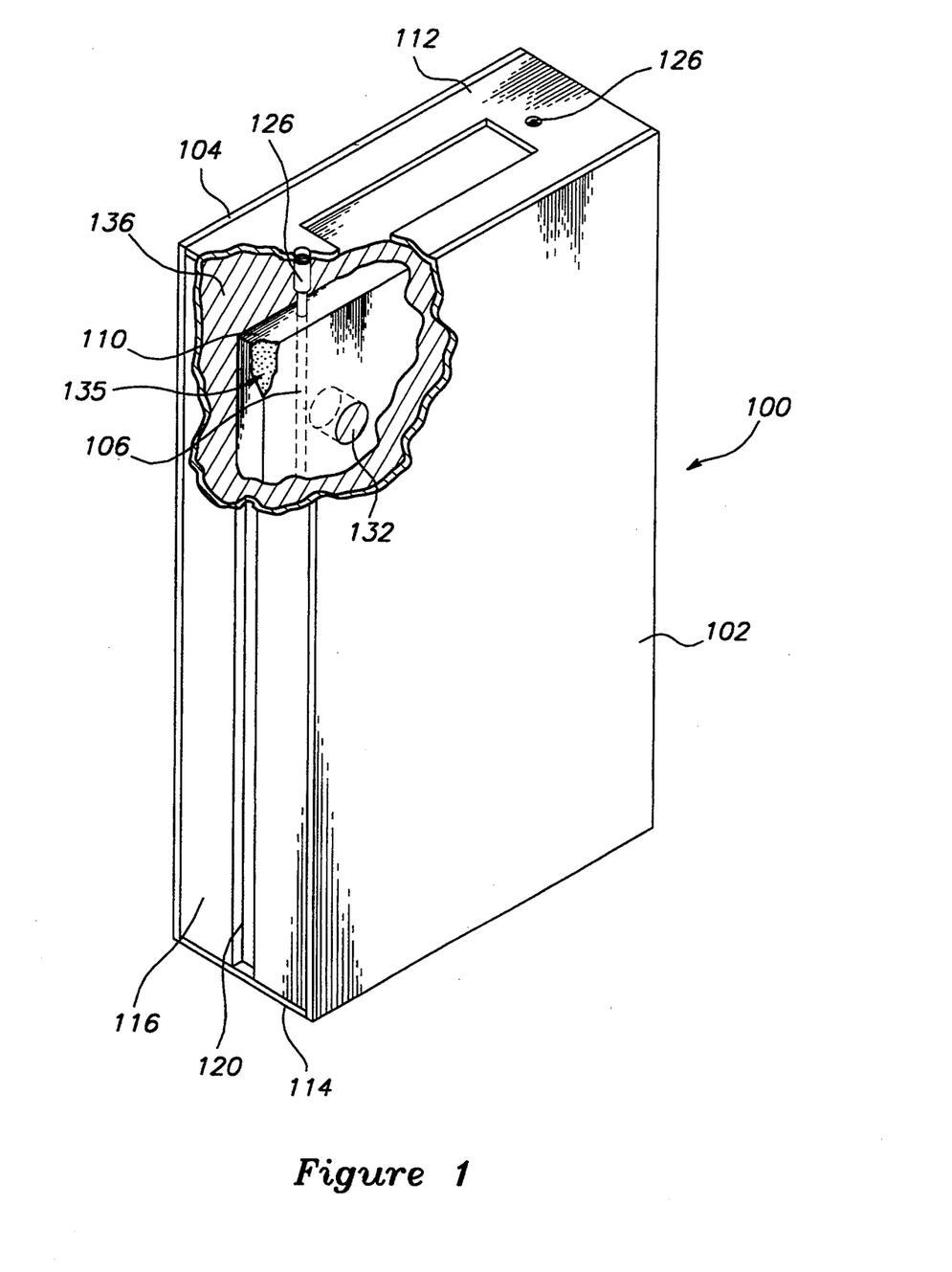
FIG. 1 is a partial isometric view of a panel constructed in accordance with the subject invention.
Figure 2:
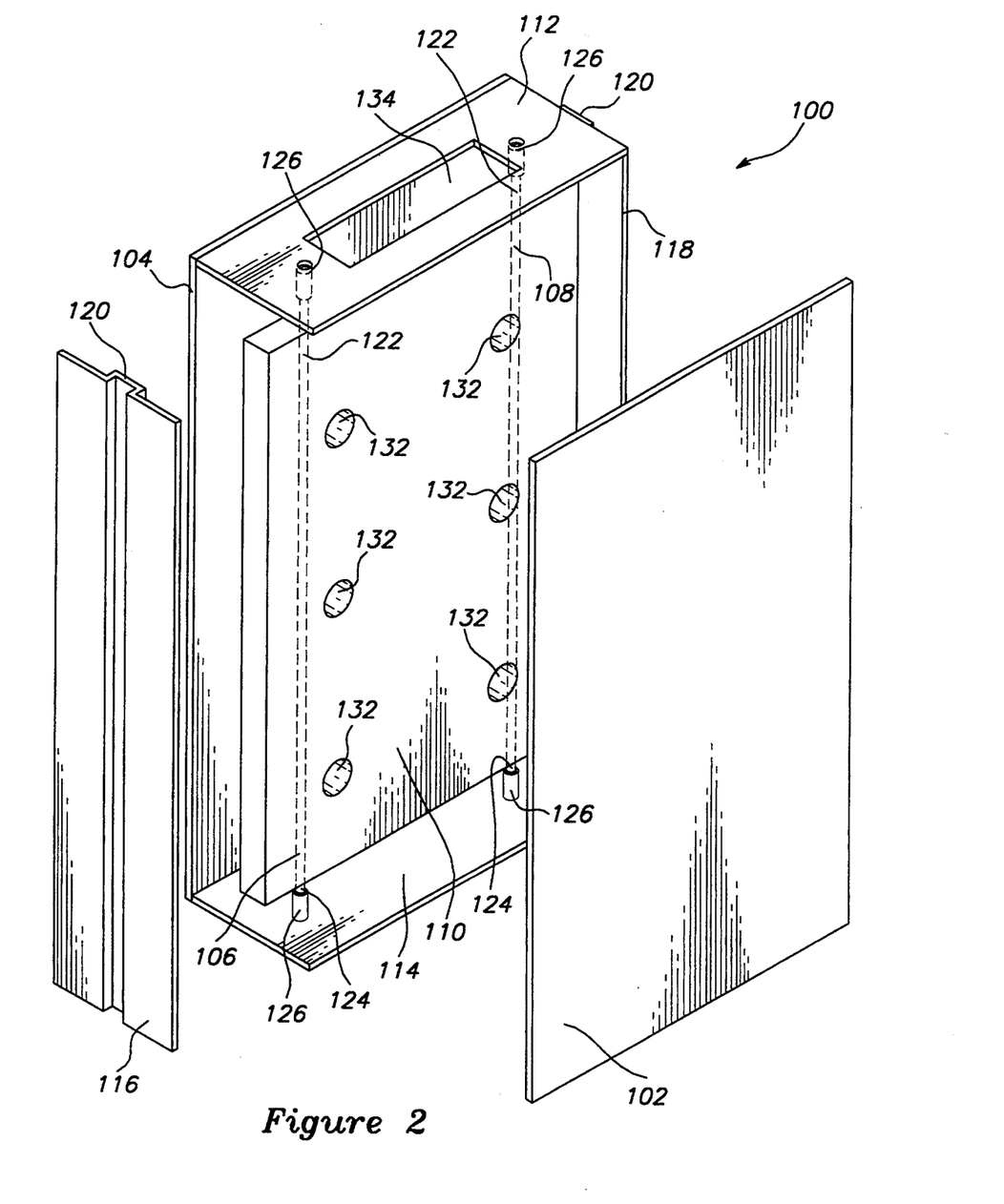
FIG. 2 is a partial exploded view of the panel illustrated in FIG. 1.
Figure 3:
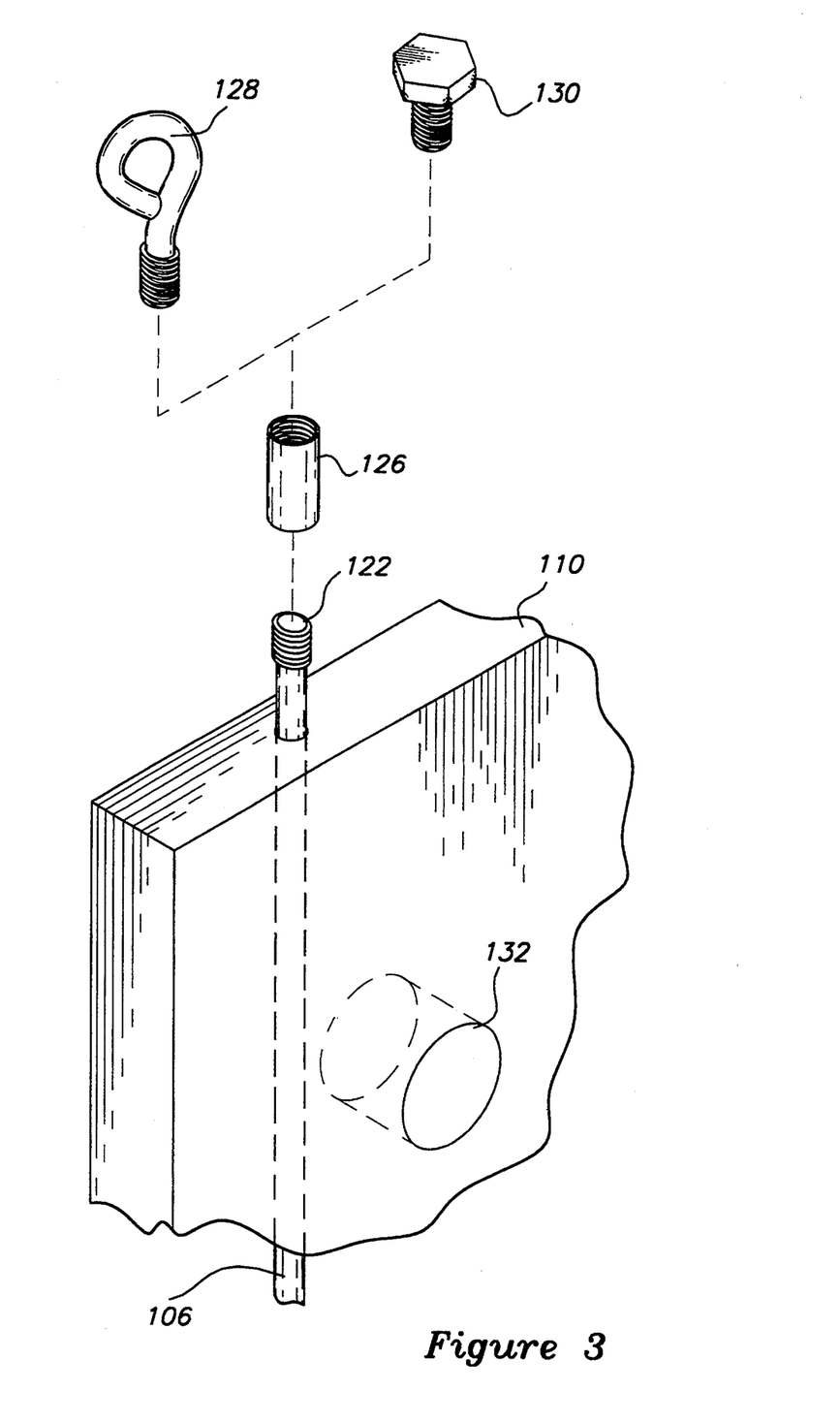
FIG. 3 is a partial isometric view of the panel illustrated in FIGS. 1 and 2.

A building panel 100 constructed in accordance with the subject invention is illustrated in FIGS. 1, 2, and 3. The building panel 100 includes first and second skin surfaces 102 and 104 positioned on opposite sides of the panel 100. The skin surfaces 102 and 104 are separated by a top and bottom 112 and 114, respectively, and first and second joining sides 116 and 118. The first and second skin surfaces 102 and 104, the top and bottom 112 and 114, and the first and second joining sides 116 and 118, are fastened together to form a core chamber, as will be described in more detail below.

The first and second joining sides 116 and 118 each have a tongue and groove 120 formed therein. The tongue and groove 120 extends from the top 112 to the bottom 114. The first joining side 116 is positioned with its tongue extending toward the second joining side 118 and the second joining side is positioned with its tongue extending away from the first joining side 116 so that the tongue and groove of adjacent building panels will mate with one another. The tongue and grooves 120 are therefore used for connecting a plurality of building panels 100 to construct a structure as is known in the art.

It will be appreciated, however, by those skilled in the art that although the present invention is shown and described by reference to a tongue and groove 120, to be used for connecting adjacent building panels 100, other apparatus could be used for this purpose. One connecting structure that may be suitable for use with the subject invention is the connecting structure shown and described in U.S. Pat. Nos. 5,012,625 and 5,090,170, entitled "BUILDING ENCLOSURE SYSTEM AND METHOD" and "BUILDING ENCLOSURE SYSTEM", respectively, both issued to Robert L. Propst. Other arrangements for providing the connecting structure provided by the tongue and grooves 120 could be used, as will readily become apparent to those skilled in the art.

The building panel 100 also includes a handling system having first and second support rods 106 and 108 that extend from the top 112 to the bottom 114. The support members may be constructed of metal, plastic, or other material suitable for supporting the insulating core during preparation of the building panel. The first and second support rods each have an engagement system including a plurality of female/female connectors 126 fixed to first and second threaded ends 122 and 124 of the first and second support rods 106 and 108. As will be described below, the handling system, including the first and second support rods 106 and 108, is an integral part of the building panel 100. The handling system provides support to the building panel 100 when it is being constructed and, in combination with the engagement system, facilitates handling of the building panel 100 after it is constructed.

After the building panel 100 is constructed, one end of the female/female connectors 126 is exposed, as illustrated in FIG. 1. Any connector of proper size having male threads can be mated with the female/female connectors of the building panel 100 to enable handling of the building panel. As an example, during construction an eyelet 128 (FIG. 3) may be mated with the female/female connectors 126 to enable lifting and positioning of the building panel 100 with construction machinery. After positioning, a bolt 130 may be mated with the female/female connectors 126 to fix a roof structure or other structure to the building panel 100.

Although the engagement system of the building panel 100 is shown and described herein by reference to the female/female connectors 126, other apparatus can be combined with the support rods 106 and 108 to enable handling of the building panel 100. Further, although two support rods 106 and 108 are illustrated herein as extending from the top 112 to the bottom 114, those skilled in the art will appreciate that more or less support rods could be used in differing configurations and positions, as part of or independent of the handling system, without departing from the scope and spirit of the subject invention. Those skilled in the art will recognize that the number and position of the support rods can also be varied to vary the resulting strength and weight characteristics of the panel.

An insulating core 110 is positioned interior of the core chamber for providing insulation to the building panel 100. During construction, the insulating core 110 is mounted to the first and second support rods 106 and 108 and thereby positioned interior of the core chamber. In a presently preferred embodiment of the invention, the insulating core 110 is positioned substantially centered between the first and second skin surfaces 102 and 104, the top and bottom 112 and 114, and the first and second joining sides 116 and 118. However, in other applications it may be desirable to alter the positioning or construction of the support rods 106 and 108 to vary the positioning of the insulating core 110.

The insulating core 110 may be secured to the first and second support rods 106 and 108 by a variety of methods that will readily become apparent to those skilled in the art. As an example, the insulating core 110 may be fabricated on the first and second support members 106 and 108 and the combination positioned in the core chamber as described above. As another alternative, the first and second support members may be placed in the core chamber and the insulating core 110 later secured thereto by suitable means. As an alterative to securing the insulating core 110 to the first and second support rods 106 and 108, the first and second support rods can provide temporary support to the insulating core 110, without being secured thereto, as will be described below.

The insulating core 110 may be selected for providing any type of insulation to the building panel 100. As examples, the insulating core 110 may be selected to provide thermal, noise, or other insulation to the building panel 100. Preferably, a lightweight material is selected for the insulating core 110 so that the strength to weight ratio of the building panel 100 can be maximized. The insulating core 110 also includes a plurality of through connectors 132 that extend from the first side 102 to the second side 104 to provide shear connectors to the panel 100, as will be described in more detail below.

The top 112 includes a fill hole 134 through which a filler material. 136 (FIG. 1) is deposited. The filler material is poured into the core chamber through the fill hole 134. The filler material fills the through connectors 132 so that when the cement composition cures, shear connectors are provided in the through connectors 132.

The filler material 136 is selected from a material that can be introduced into the core chamber in relatively fluid form to take the form of the core chamber and to fill the through connectors 132. The filler material 136 is further selected to be a material that can be hardened, by curing or otherwise, to provide structural rigidity to the building panel 100. In a presently preferred embodiment of the invention, the filler material 136 is selected as a relatively lightweight material to improve the overall strength to weight ratio of the building panel 100.

As an example, in one presently preferred embodiment of the invention, the filler material 136 is an improved cement composition such as that disclosed and claimed in U.S. patent application Ser. No. 07/859,585 entitled "IMPROVED CEMENT COMPOSITION AND MATERIAL", filed Mar. 27, 1992, by Grant Record, the disclosure of which is incorporated herein, in its entirety, by the foregoing reference thereto. The cement composition is created from cellular cement and a sufficient amount of diatomaceous earth to substantially improve the insulating and fire-resistance properties of the composition while not detracting materially from its strength, and other proprietary materials used to strengthen the material. The cellular cement is created to include a plurality of fluid pockets 135 having substantially the same size and shape, wherein the fluid in the pockets is of a density less than that of the cement used in the composition. By adding the fluid pockets 135 to the composition, the overall density and weight of the composition is decreased and the insulating properties of the composition are enhanced.

It will be apparent, however, to those skilled in the art that other materials could be used for the filler material 136, without departing from the true scope and spirit of the subject invention. The primary consideration in selecting the appropriate filler material is the desired strength to weight ratio to be maintained, in combination with minimum strength and maximum weight specifications. Accordingly, the filler material will be selected to provide predetermined load bearing strength and weight characteristics. In applications where the load bearing strength can be less than that desired for load bearing panels, materials much lighter than those used for load bearing panels may be used for the filler material 136.

After the filler material 136 is introduced into the core chamber to take the form of the core chamber, and to fill the through connectors 132 the filler material is cured or dried, by the most appropriate method. The resulting panel will include a plurality of shear connectors that are formed by the fill material in the througholes 132. The effect of the shear connectors is to substantially increase the shear strength of the building panel 100. Accordingly, in addition to varying the load bearing strength and weight characteristics of the building panel by varying the composition of the filler material, as discussed above, the shear strength of the building panel can be increased and/or decreased by varying the number and positioning of shear connectors, i.e., varying the number and positioning of throughholes in the insulating core 110. Therefore, the construction for the building panel 100 provides the user with the ability to select load bearing strength, shear strength, and weight, by varying the composition of the filler material and the construction, positioning, number, shape, etc., of the shear connectors. Still further, both the load bearing strength and the shear strength of the building panel 100 may be altered by varying the size and positioning of the insulating core 110 and resultant change in filler material 136 thickness. Still other variations will readily become apparent to those skilled in the art, e.g. using two insulating cores to construct an intermediate post; providing a channel diagonally across the insulating core to provide a cross bracing member, etc.

The resulting building panel may be constructed with compressive strengths in excess of about 40,000 pounds per square inch (per ASTM E-72 which calls for worst case eccentric loading) and weight of 2 to 10 pounds per square foot (based on 4'×8'×6" panel). Further, the building panel is fire and water proof and impervious to rot and insect damage. Still further, the building panel is a good thermal and acoustical insulator. A typical building panel, constructed with a thickness of 6 inches will exhibit an insulating value in excess of R30.

Structural panels made with the cement compositions described above are lightweight, so that it is easier to handle the structural panels, thereby decreasing the cost of the resulting structure. Construction of a composite building panel as described here is an example of an embodiment of the invention. The building panel is prepared by placing an amount of the above described cement composition in a mold or box form. An insulating material is then placed in the form and an additional amount of the above described cement composition is placed on top of the insulating material so that the insulating material is intermediate the cement composition. After curing, the resulting building panel is highly thermally insulating (30+"R"), strong, and lightweight. The building panel may be impregnated with a polymer to provide a smooth and bondable outer surface integral with the subsurface for binding laminate finishes.

In an alternative embodiment of the present invention, the inside of the first and second skin surfaces 102 and 104 are coated with an organic polymer that is dried prior to adding the filler material to the core chamber. The organic polymer is applied while the first and second skin surfaces 102 and 104 are positioned inside the core chamber, however, those skilled in the art will appreciate that the organic polymer may be added to the first and second skin surfaces 102 and 104 prior to positioning them in the core chamber. The organic polymer is typically selected to provide bonding strength between the first and second skin surfaces 102 and 104 and the filler material 136 when the filler material contains chemically active components that react with the organic coated surfaces of the first and second skin surfaces.

After the first and second skin surfaces are in position with the organic polymer dried to the surface thereof, the filler material is added to the core chamber and the building panel 100 is placed in a convenient location for the combination to cure. After curing, the first and second skin surfaces become an integral part of the building panel 100, eliminating the need for otherwise fixing a surface material to the panel as with prior art constructions.

In another alternative construction for the building panel, a box form is provided with an outside dimension corresponding to the width, height, and thickness of the desired building panel. The box form includes first and second generally planar sides that are spaced from one another by a distance corresponding to the desired thickness of the building panel. Support members, such as first and second support rods 106 and 108 (FIGS. 1 and 2), are positioned interior of the box form for supporting an insulating core during preparation. The support members are generally oriented horizontally and/or vertically and positioned centrally of the box form.

An insulating core is then positioned proximate the support members thereby to be supported in the box form generally centered between the first and second planar sides. A panel surface material, such as for example, a laminate or other known skin surface, is positioned inside the box form proximate the first and second planar sides. The panel surface material may comprise one or more sides of the resulting building panel. In a presently preferred embodiment of the invention, all six surfaces of the building panel are placed in the box form, e.g., first and second skin surfaces 102 and 104, top and bottom 112 and 114, and first and second joining sides 116 and 118, described by reference to FIGS. 1 and 2, may be placed in the box form. In another presently preferred embodiment of the invention, only two surfaces of the building panel, e.g., first and second skin surfaces 102 and 104, illustrated in FIGS. 1 and 2, are placed in the box form. It will be apparent to those skilled in the art that any number and selection of surfaces of the building panel may be placed in the box form in accordance with the subject invention.

In another alternate embodiment of the above-described building panel, a four to six sided box form made of magnesium oxide, or similar material, is filled with a filler material with or without cores inserted. This configuration can be used as a fire resistant door, a building panel, a beam component, etc. The chief feature of this embodiment is that both main side surfaces of the six sided box can be customized to replicate any desired surface during the box molding process. This material can look like a brick, natural rock, wood, or smooth surface and it is impervious to very high heat (in excess of 2,000° F.).

In a further alternate embodiment of the above described building panel, organic components are added to the cement composition in addition to, or in lieu of, being added to the panel surface material. In addition, the panels may be prepared per the above paragraphs except without the insulating core. Such solid panels will not decompose upon exposure to very high temperatures (1,800 degrees F., or greater) or upon cool down from such high temperature exposures.

From the foregoing, it will be appreciated that, although specific embodiments of the invention have been described herein for purposes of illustration, various modifications may be made without deviating from the spirit and scope of the invention. Accordingly, the invention is not limited except as by the appended claims.

I claim:

1. Structural building component comprised of:
    a surface material having a means for providing bonding strength applied to a first surface thereof;
    a filler material including a sufficient amount of a chemically active component so thin said filler material and said means for providing bonding strength of said surface material are substantially integrally bonded; and
    insulating core means positioned interior of said filler material for improving the insulating properties of said structural building component, said insulating core means including a first side, a second side, and a throughole extending from said first side to said second side with said filler material positioned in said throughole.

2. The structural building component as recited in claim 1 wherein said filler material comprises a cement composition having a plurality of fluid pockets wherein each of said plurality of fluid pockets is of substantially similar size and wherein the plurality of fluid pockets are substantially evenly distributed throughout said cement base.

3. The structural building component as recited in claim 1 wherein the structural building component includes an exterior surface, said structural building component further including:
    a support member positioned interior of said filler component and extending to the exterior surface thereof, said support member including fastening means for engaging and physically positioning said structural building component.

4. A building component comprising:
    first and second surfaces each having an exposed side and a bonded side, said first and second surfaces further having an organic polymer applied to said bonded side thereof;
    a top and bottom positioned substantially intermediate the first and second surfaces at opposite ends thereof said top having a through connector formed therein;
    first and second joining sides positioned inter:mediate said first and second surfaces and extending from said top to said bottom to define a core chamber of said building panel, said first and second joining sides each having a tongue and groove formed therein, said tongue and groove extending from said top to said bottom, said first joining side being positioned with said tongue extending toward said second joining side and said second joining side being positioned with said tongue extending away from said first joining said so that the tongue and groove of adjacent building components will mate;
    an insulating core positioned within said core chamber, said insulating core being provided for improving the insulating characteristics of said building component, and providing the designer with a flexible integral medium whereby the compressive and shear strengths of the building component can be changed at will over a large dynamic range, said insulating core includes a plurality of through connectors extending laterally through said insulating core in a direction from said first surface toward said second surface; and
    a cured cement composition positioned within said core chamber, substantially surrounding said insulating core, said cured cement composition being further positioned within said through connectors of said insulating core to firm shear connectors for improving the shear strength of said building panel, said cured cement composition including cement with a plurality of fluid pockets, said plurality of fluid pockets being substantially filled with a fluid, said cured cement composition further including chemically active components which will react with organic polymers on building component side covers so as to substantially integrally bond with said first and second cover surfaces.

5. Structural building component comprised of:
a filler material;
insulating core means positioned interior of said filler material for improving the insulating properties of said structural building component, said insulating core means including a first side, a second side, and a throughhole extending from said first side to said second side; and
shear connector means for increasing the shear strength of the structural building component, said shear connector means being constructed of said filler material and positioned in said throughhole.

6. The structural building component as recited in claim 5 wherein said shear connector means is integrally constructed with said filler material.

7. The structural building component as recited in claim 5 wherein said insulating core means further comprises a plurality of throughholes and wherein said shear connector means is positioned in each of said plurality of throughholes.

8. The structural building component as recited in claim 5 wherein said filler material comprises a cement composition having a plurality of fluid pockets wherein each of said plurality of fluid pockets is of substantially similar size and wherein the plurality of fluid pockets are substantially evenly distributed throughout said cement base.

9. The structural building component as recited in claim 5 wherein the structural building component includes an exterior surface, said structural building component further including:
a support member positioned interior of said filler material and extending to the exterior surface thereof, said support member including fastening means for engaging and physically positioning said structural building component.

10. The structural building component as recited in claim 5 wherein said insulating core means comprises first and second insulating cores spaced to define an interior channel, said structural building component further comprising intermediate post means positioned in said interior chamber.

11. The structural building component as recited in claim 10 wherein said intermediate post means is constructed from said filler material.

12. The structural building component as recited in claim 10 wherein said intermediate post means is integrally with said filler material.

13. The building component of claim 4, further comprising first and second support rods positioned intermediate said first and second surfaces and extending from said top to said bottom, said first and second support rods each having first and second threaded ends and having a female/female connector secured to each of the first and second threaded ends, said insulating core positioned within said core chamber substantially proximate said first and second support rods.

14. A structural building component comprised of:
a filler material forming side panels that define an interior chamber, said interior chamber being completely surrounded on all sides by said filler material;
insulating core means positioned interior of and confined by said filler material for improving the insulating properties of said structural building component, said insulating core means including a first side, a second side, and a throughhole extending from said first side to said second side; and
shear connector means for increasing the shear strength of the structural building component, said shear connector means being positioned in said throughhole.

15. The structural building component as recited in claim 14 wherein said shear connector means is constructed from said filler material.

16. The structural building component as recited in claim 14 wherein said shear connector means is integrally constructed with said filler material.

17. The structural building component as recited in claim 14 wherein said insulating core means further comprises a plurality of throughholes and wherein said shear connector means is positioned in each of said plurality of throughholes.

18. The structural building component as recited in claim 14 wherein said filler material comprises a cement composition having a plurality of fluid pockets wherein each of said plurality of fluid pockets is of substantially similar size and wherein the plurality of fluid pockets is substantially evenly distributed throughout said cement base.

19. The structural building component as recited in claim 14 wherein the structural building component includes an exterior surface, said structural building component further including:
a support member positioned interior of said interior chamber and extending to the exterior surface thereof, said support member including fastening means for engaging and physically positioning said structural building component.

20. The structural building component as recited in claim 14 wherein said insulating core means comprises first and second insulating cores spaced to define an interior channel, said structural building component further comprising intermediate post means positioned in said interior chamber.

21. The structural building component as recited in claim 20 wherein said intermediate post is constructed from said filler material.

22. The structural building component as recited in claim 20 wherein said intermediate post is integrally constructed with said filler material.

23. A structural building component comprised of:
a filler material;
insulating core means positioned interior of said filler material for improving the insulating properties of said structural building component, said insulating core means including a first side, a second side, and first and second throughholes extending from said first side to said second side; and
first and second shear connector means for increasing the shear strength of the structural building component, said first and second shear connector means being positioned in said first and second throughholes respectively.

24. The structural building component as recited in claim 23 wherein said shear connector means is integrally constructed with said filler material.

25. The structural building component as recited in claim 23 wherein said filler material comprises a cement composition having a plurality of fluid pockets wherein each of said plurality of fitted pockets is of substantially similar size and wherein the plurality of fluid pockets is substantially evenly distributed throughout said cement base.

26. The structural building component as recited in claim 23 wherein the structural building component includes an exterior surface, said structural building component further including:
a support member positioned interior of said filler material and extending to the exterior surface thereof, said support member including fastening means for engaging and physically positioning said structural building component.

27. The structural building component as recited in claim 23 wherein said insulating core means comprises first and second insulating cores spaced to define an interior channel, said structural building component further comprising intermediate post means positioned in said interior chamber.

28. The structural building component as recited in claim 23 wherein said intermediate post is constructed from said filler material.

29. The structural building component as recited in claim 23 wherein said intermediate post is integrally constructed with said filler material.

30. Structural building component comprised of:
a filler material;
insulating core means positioned interior of said filler material for improving the insulating properties of said structural building component, said insulating core means including a first side, a second side, and a throughole extending from said first side to said second side thereby to define a volume intermediate said filler material and said throughole; and
shear connector means for increasing the shear strength of the structural building component, said shear connector means being positioned in said volume.

31. The structural building component as recited in claim 30 wherein said shear connector means is integrally constructed with said filler material.

32. The structural building component as recited in claim 30 wherein said insulating core means further comprises a plurality of throughholes cooperating with said filler material to define a plurality of volumes and wherein said shear connector means is positioned in said plurality of volumes.

33. The structural building component as recited in claim 30 wherein said filler material comprises a cement composition having a plurality of fluid pockets wherein each of said plurality of fluid pockets is of substantially similar size and wherein the plurality of fluid pockets is substantially evenly distributed throughout said cement base.

34. The structural building component as recited in claim 30 wherein the structural building component includes an exterior surface, said structural building component further including:
a support member positioned interior of said filler material and extending to the exterior surface thereof, said support member including fastening means for engaging and physically positioning said structural building component.

35. A structural building component comprised of:
a filler material;
insulating core means positioned interior of said filler material for improving the insulating properties of said structural building component, said insulating core means including a first side, a second side, and a throughole extending from said first side to said second side; and
shear connector means for increasing the shear strength of the structural building component, said shear connector means being positioned in said throughole, said filler material, said insulating core means, and said shear connector means being interconnected and constructed of materials such that said building component has a strength to weight ratio of at least 27:1.

36. The structural building component as recited in claim 35 wherein said shear connector means is constructed from said filler material.

37. The structural building component as recited in claim 35 wherein said shear connector means is integrally constructed with said filler material.

38. The structural building component as recited in claim 35 wherein said insulating core means further comprises a plurality of throughholes and wherein said shear connector means is positioned in each of said plurality of throughholes.

39. The structural building component as recited in claim 35 wherein the structural building component includes an exterior surface, said structural building component further including:
a support member positioned interior of said filler material and extending to the exterior surface thereof, said support member including fastening means for engaging and physically positioning said structural building component.

40. The structural building component as recited in claim 35 wherein said insulating core means comprises first and second insulating cores spaced to define an interior channel, said structural building component further comprising intermediate post means positioned in said interior chamber.

41. The structural building component as recited in claim 40 wherein said intermediate post is constructed from said filler material.

42. The structural building component as recited in claim 40 wherein said intermediate post is integrally constructed with said filler material.

43. Structural building component comprised of:
a filler material having a first density;
insulating core means positioned interior of said filler material for improving the insulating properties of said structural building component, said insulating core means including a first side, a second side, and a throughole extending from said first side to said second side, said insulating core having a second density, a ratio of said first density to said second density being at least 1.667:1; and
shear connector means for increasing the shear strength of the structural building component, said shear connector means being positioned in said throughole.

44. The structural building component as recited in claim 31 wherein said shear connector means is constructed from said filler material.

45. The structural building component as recited in claim 43 wherein said shear connector means is integrally constructed with said filler material.

46. The structural building component as recited in claim 43 wherein said insulating core means further comprises a plurality of throughholes and wherein said shear connector means is positioned in each of said plurality of throughholes.

47. The structural building component as recited in claim 43 wherein the structural building component includes an exterior surface, said structural building component further including:

a support member positioned interior of said filler material and extending to the exterior surface thereof, said support member including fastening means for engaging and physically positioning said structural building component.

* * * * *

UNITED STATES PATENT AND TRADEMARK OFFICE
CERTIFICATE OF CORRECTION

PATENT NO.     : 5,440,846
DATED          : August 15, 1995
INVENTOR(S)    : Grant C. Record It is certified that error appears in the above identified patent and that said Letters Patent is hereby corrected as shown below:

In column 7, claim 1, line 67, please delete "thin" and substitute therefor --that--.

In column 8, claim 4, line 62, please delete "firm" and substitute therefor --form--.

In column 9, claim 12, line 51, after "grally" please insert --constructed--.

In column 10, claim 24, line 62, please delete ":inte-" and substitute therefor --inte--.

In column 11, claim 32, line 42, please delete ":means" and substitute therefor --means--.

Signed and Sealed this

Sixteenth Day of January, 1996

Attest:

BRUCE LEHMAN

Attesting Officer

Commissioner of Patents and Trademarks